United States Patent
Kobayashi et al.

(10) Patent No.: US 7,213,455 B2
(45) Date of Patent: *May 8, 2007

(54) THERMAL TYPE GAS FLOW MEASURING INSTRUMENT

(75) Inventors: Chihiro Kobayashi, Naka (JP); Shinya Igarashi, Naka (JP)

(73) Assignees: Hitachi, Ltd., Tokyo (JP); Hitachi Car Engineering Co., Ltd., Ibaraki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/012,290

(22) Filed: Dec. 16, 2004

(65) Prior Publication Data

US 2005/0132795 A1   Jun. 23, 2005

(30) Foreign Application Priority Data

Dec. 19, 2003   (JP)   .............................. 2003-421975

(51) Int. Cl.
*G01F 1/68* (2006.01)

(52) U.S. Cl. ................... 73/204.25; 73/204.15

(58) Field of Classification Search ............... 73/202.5, 73/204.11, 204.16–204.19, 204.25, 204.24, 73/204.15

See application file for complete search history.

(56) References Cited

U.S. PATENT DOCUMENTS

| | | | |
|---|---|---|---|
| 4,264,961 A | | 4/1981 | Nishimura et al. |
| 4,649,745 A | * | 3/1987 | Kondo et al. ............... 73/118.2 |
| 6,230,559 B1 | * | 5/2001 | Igarashi et al. .......... 73/204.25 |
| 6,349,596 B1 | | 2/2002 | Nakada et al. |
| 6,435,023 B1 | * | 8/2002 | Kobayashi et al. ...... 73/204.25 |
| 2004/0025584 A1 | * | 2/2004 | Akamatsu et al. ........ 73/204.11 |

FOREIGN PATENT DOCUMENTS

| | | |
|---|---|---|
| DE | 3910676 | 10/1990 |
| ER | 1065475 | 1/2001 |
| JP | 11-295125 | 10/1999 |

* cited by examiner

*Primary Examiner*—Harshad Patel
(74) *Attorney, Agent, or Firm*—Mattingly, Stanger, Malur & Brundidge, P.C.

(57) ABSTRACT

A thermal type gas flow measuring instrument measures gas flow with high precision by accurately correcting changes in radiation heat characteristics of a heating resistor due to contamination. The instrument comprises a second heating resistor 30 whose resistance value, which changes if contaminated, is calculated by measuring the terminal voltage thereof by calculating means 32, and the calculated value is compared with a temperature detected by a temperature detecting element 31. Based on the result of comparison, the level of contamination of the second heating resistor 30 is determined. The second heating resistor 30 and the first heating resistor 3 are disposed in similar environments such that their levels of contamination can be considered equal. Based on the level of contamination calculated from the result of comparison, a correction value is calculated and the output of the first heating resistor 3 is corrected in accordance with the correction value.

8 Claims, 3 Drawing Sheets

AIR CLEANER SIDE     ENGHINE SIDE

THERMAL TYPE GAS FLOW MEASURING INSTRUMENT

BACKGROUND OF THE INVENTION

1. Field of the Invention

The invention relates to a thermal type gas flow measuring instrument or measuring gas flow, such as air flow.

2. Description of Related Art

As an example of the gas flow type measuring instrument, a thermal type air flow measuring instrument is known for measuring the intake air flow in automobile internal combustion engines.

This thermal type air flow measuring instrument takes advantage of the fact that the amount of heat dissipated from a heating resistor increases at a steady rate relative to the intake air flow. Because of its capability to directly measure the mass flow, it is widely utilized as a flow measuring device for automobile fuel control purposes.

As a technology for improving the accuracy of flow measurement in the above-mentioned thermal type air flow measuring instrument, Patent Document 1 discloses an invention entitled "Method for controlling an internal combustion engine using air flow measuring apparatus."

The technology described in Patent Document 1 involves a self-diagnosis of the air flow measuring apparatus for measuring intake air flow in an internal combustion engine, on the basis of an output signal that is obtained in the absence of intake air flow. Based on the results of the self-diagnosis, the intake air flow signal is modified, or a warning is provided to indicate abnormality.

In the technology of Patent Document 1, the thermal type air flow measuring instrument and an engine control unit must be continuously supplied with electric power until a certain time has elapsed following the termination of the engine. This is because the intake air flow must be zero when a self-diagnosis is performed.

Patent Document 1: JP Patent Publication (Kokai) No. 11-295125 A (1999)

SUMMARY OF THE INVENTION

The aforementioned thermal type air flow measuring instrument is a device that measures air flow by measuring the amount of heat dissipated into the air. Namely, it measures air flow by utilizing the fact that flow rate is low and so the dissipation of heat from a heat wire into the air is small when air flow is small, and, conversely, flow rate is high and the dissipation of heat into the air is large when air flow is large.

Thus, if the amount of dissipation of heat changes due to durability deterioration, for example, of the heat wire, which is a heating resistor, a characteristic value of the heat wire varies from its initial value even under the same conditions. A most significant example of such durability deterioration is the influence of contamination due to dust or the like that has become attached to the heat wire.

For example, when measuring intake flow in an internal combustion engine, such components as dust contained in intake air and oil or carbon components discharged from the engine into the intake pipe could become attached to the heating resistor.

In general, however, the thermal type air flow measuring instruments used for internal combustion engines are mounted downstream of the air cleaner. As a result, most of the dust components in the intake air are adsorbed on the air cleaner filter and does not therefore reach the heat wire portion of the instrument.

Nevertheless, microscopic dust with a size on the order of several microns passes through the filter and does reach the air flow measuring device. After a long period of time, the microscopic dust components build up on the heat wire portion and eventually coat the heat wire.

When the wire is thus coated by the dust, direct dissipation of heat from the heat wire is blocked. More accurately, the heat is dissipated to air through heat conduction of the deposited dust.

As the dust is accumulated with time, the amount of heat conduction by the dust gradually varies from its initial state, resulting in a corresponding amount of durability deterioration of the thermal type air flow measuring instrument.

It is very difficult to correct such a varying amount of deterioration because during the measurement of air flow, the throttle opening angle and the rotation speed are not constant so that air flow constantly changes. Even if attempts are made to perform the correction by making the throttle angle and rotation speed constant so as to obtain a constant air flow, that would merely make volume flow constant and would not make mass air flow, which is required for the engine control, constant, due to differences in air density caused by daily changes in temperature and atmospheric pressure.

Furthermore, in accordance with the aforementioned conventional technique for correcting a flow signal after the intake air amount has become zero in Patent Document 1, it is impossible to carry out the correction of the durability deterioration of the heating resistor when the vehicle is in operation.

It is therefore an object of the invention to provide a highly accurate apparatus for measuring gas flow that is capable of accurately correcting changes in radiation heat characteristics due to contamination of the heating resistor.

In order to achieve the aforementioned object, the thermal type air flow measuring instrument according to the invention comprises a first heating resistor for measuring gas flow and a second heating resistor for detecting the degree of deterioration of the first heating resistor. By detecting the degree of deterioration of the second heating resistor, the degree of deterioration of the first heating resistor for measuring gas flow is calculated, and the gas flow is corrected on the basis of the thus calculated degree of deterioration.

In this way, measurement error in mass air flow can be directly corrected.

By heating the second heating resistor, which is separate from the first heating resistor for measuring gas flow, using a constant electric current regardless of the gas temperature, the radiation heat characteristics of the second heating resistor vary upon attachment of contaminants or the like thereon. In this case, it can be assumed that the change in the radiation heat characteristics of the second heating resistor is similar to the change in the radiation heat characteristics of the first heating resistor.

By comparing the gas temperature calculated from the temperature of the heat generated from the second heating resistor with an actual gas temperature determined by an intake temperature sensor, such as a thermistor, the amount of deterioration of the first heating resistor for gas flow measurement due to contamination can be determined, so that the necessary amount of correction can be calculated.

Thus, in accordance with the invention, a highly accurate gas flow measuring apparatus can be provided that is capable of accurately correcting changes in the radiation heat characteristics of the heating resistor due to contamination.

By applying the thermal type air flow measuring instrument of the invention in an internal combustion engine control system, an optimum engine combustion state can be obtained at all times, which contributes to a reduction of exhaust gas.

DETAILED DESCRIPTION OF THE PREFERRED EMBODIMENTS

The invention is described in detail hereafter by way of a preferred embodiment thereof, with reference made to the attached drawings.

The embodiment as described below is an example in which the invention is applied to a thermal type air flow measuring instrument used for controlling the operation of an internal combustion engine.

Figure 1:
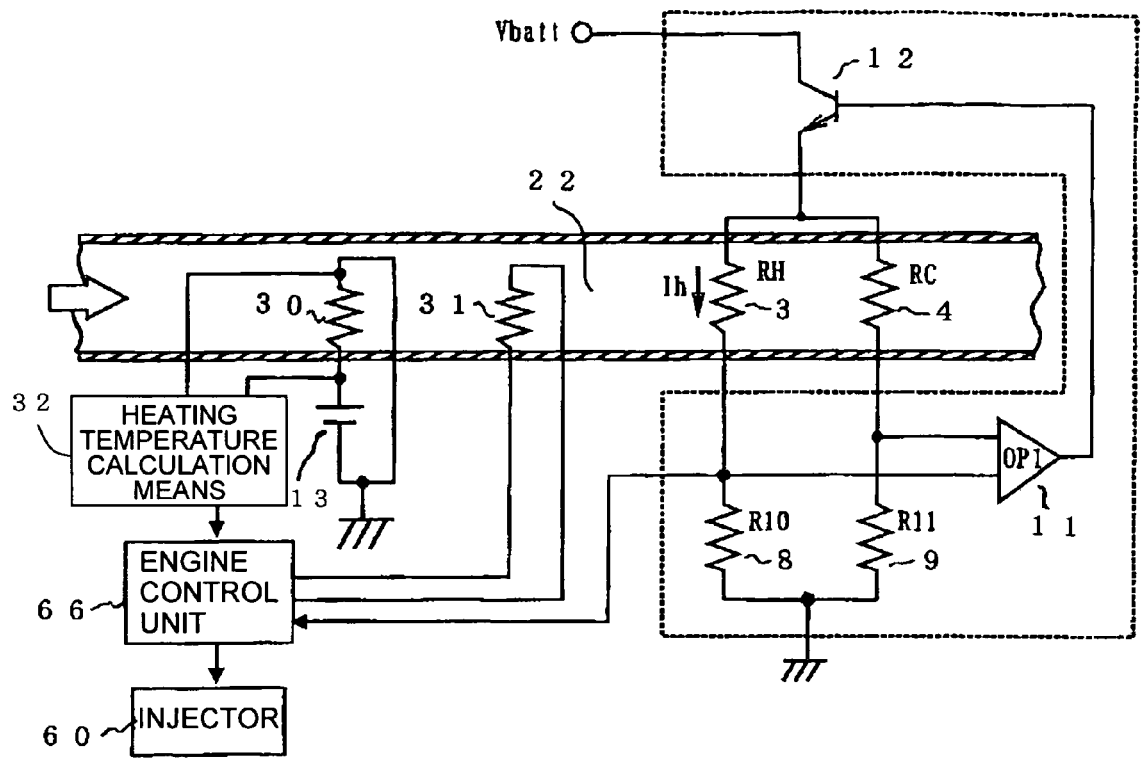
FIG. 1 shows a schematic circuit diagram of a thermal type air flow measuring instrument according to an embodiment of the invention.

The operation principle of the thermal type air flow measuring instrument of the invention is described with reference to FIG. 1 showing a schematic circuit diagram of the instrument according to the embodiment.

A drive circuit of the thermal type air flow measuring instrument is mainly made up of a bridge circuit and a feedback circuit. The bridge circuit includes a first heating resistor 3 for measuring intake air flow, a temperature sensing resistor 4 for compensating the intake air temperature, a resistor 8 connected in series with the temperature sensing resistor 4, and a resistor 9 connected in series with the heating resistor 3.

A connection point between the heating resistor 3 and the resistor 8 is connected to one of the input terminals of an operational amplifier 11. A connection point between the temperature sensing resistor 4 and the resistor 9 is connected to the other input terminal of the operational amplifier 11. The heating resistor 3 and the temperature sensing resistor 4 are disposed at a location in a main passage 22 where there is the flow of air.

An output signal from the operational amplifier 11 is supplied to the base of a transistor 12. The collector of the transistor 12 is connected to a voltage source, and the emitter is connected to a connection point between the heating resistor 3 and the temperature sensing resistor 4.

A heating current Ih is caused to flow in the heating resistor 3 such that a constant temperature difference is maintained between the heating resistor 3 and the temperature sensing resistor 4 while providing a feedback using the operational amplifier 11 via the transistor 12. The heating resistor 3 outputs an output signal V2 (electric current signal) that is proportional to air flow.

Specifically, the heating current Ih is increased when the rate of air flow is high and a large amount of heat is dissipated from the heating resistor 3. On the other hand, when the rate of air flow is low, the amount of heat dissipated from the heating resistor 3 is smaller, thus requiring a smaller amount of heating current.

A second heating resistor 30 is also disposed at a location in the main passage where there is the flow of air, as in the case of the first heating resistor 3. The second heating resistor 30 is connected to a constant voltage source 13 and is heated with a constant current. The heating temperature of the second heating resistor 30 varies depending on the temperature of intake air.

Specifically, when the intake air temperature is high, the heating temperature of the second heating resistor 30 increases, and when the intake air temperature is low, the heating temperature decreases. The voltage value of the voltage source 13 is adjusted such that the average heating temperature of the second heating resistor 30 is substantially equal to that of the first heating resistor 3 for air flow measurement.

A temperature measuring element 31, which is an intake temperature measuring means comprising a thermistor, for example, is also disposed at a location in the main passage 22 where there is the flow of air.

The voltage across the second heating resistor 30 is measured by a heating-temperature calculation means 32, and an instantaneous resistance value of the second heating resistor 30 is calculated from the thus measured terminal voltage. A temperature corresponding to the calculated resistance value is then calculated by the heating-temperature calculation means 32, and the thus calculated temperature value is supplied to an engine control unit 66.

To the engine control unit 66, there are also supplied temperature information detected by the temperature detecting element 31, and an output signal V2 from the heating resistor 3 that is in accordance with air flow.

The engine control unit 66 corrects the output signal from the first heating resistor 3 in accordance with the temperature information from the temperature detecting element 31 and the temperature information based on the second heating resistor 30, and calculates an intake air flow. The engine control unit 66 then outputs an instruction signal to an injector 60 in accordance with the calculated intake air flow.

Figure 2:
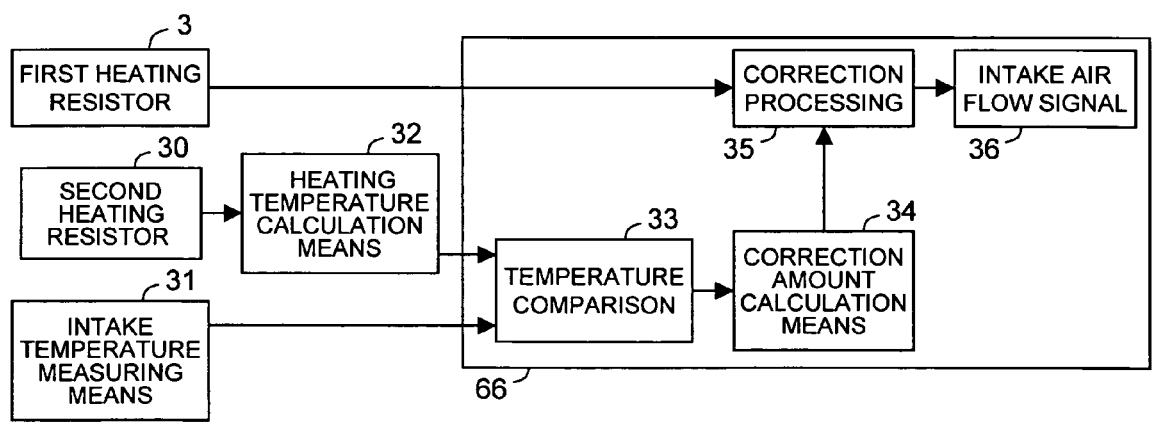
FIG. 2 shows a functional block diagram of a portion of an engine control unit that relates to the invention.

FIG. 2 shows a functional block diagram of a part of the engine control unit 66 that relates to the invention.

The engine control unit 66 includes a temperature comparison means 33, a correction amount calculation amount calculation means 34, a correction processing means 35, and an intake air flow calculation means 36. The temperature comparison means 33 compares the temperature from the heating temperature calculation means 32 with the temperature from the intake temperature measuring element 31.

If a contaminant attaches to the second heating resistor 30, its resistance value varies. Therefore, by measuring the terminal voltage of the second heating resistor 30, calculating its resistance value, calculating a temperature, and comparing it with the actual temperature, the level of contamination of the second heating resistor 30 can be determined on the basis of the result of comparison. Since the second heating resistor 30 and the first heating resistor 3 are disposed in similar environments, the level of contamination of the second heating resistor 30 can be considered equal to the level of contamination of the first heating resistor 3.

The result of temperature comparison by the temperature comparison means 33 is supplied to the correction amount calculation means 34. Based on the level of contamination that can be calculated from the temperature comparison result, and based on data indicating the relationship between the level of contamination and thermal dissipation characteristics that is obtained in advance by experiments or the like, the correction amount calculation means 34 calculates a correction value for the output of the first heating resistor 3.

The correction value calculated by the correction amount calculation means 34 is supplied to the correction processing means 35, to which there is also supplied the output signal from the first heating resistor 3. The output signal from the heating resistor 3 is corrected on the basis of the correction amount supplied from the correction amount calculation means 34, and the corrected signal is supplied to the intake air flow signal output means 36. The operation of the injector 60, for example, is controlled in accordance with an intake air flow signal outputted from the intake air flow signal output means 36.

Figure 3:
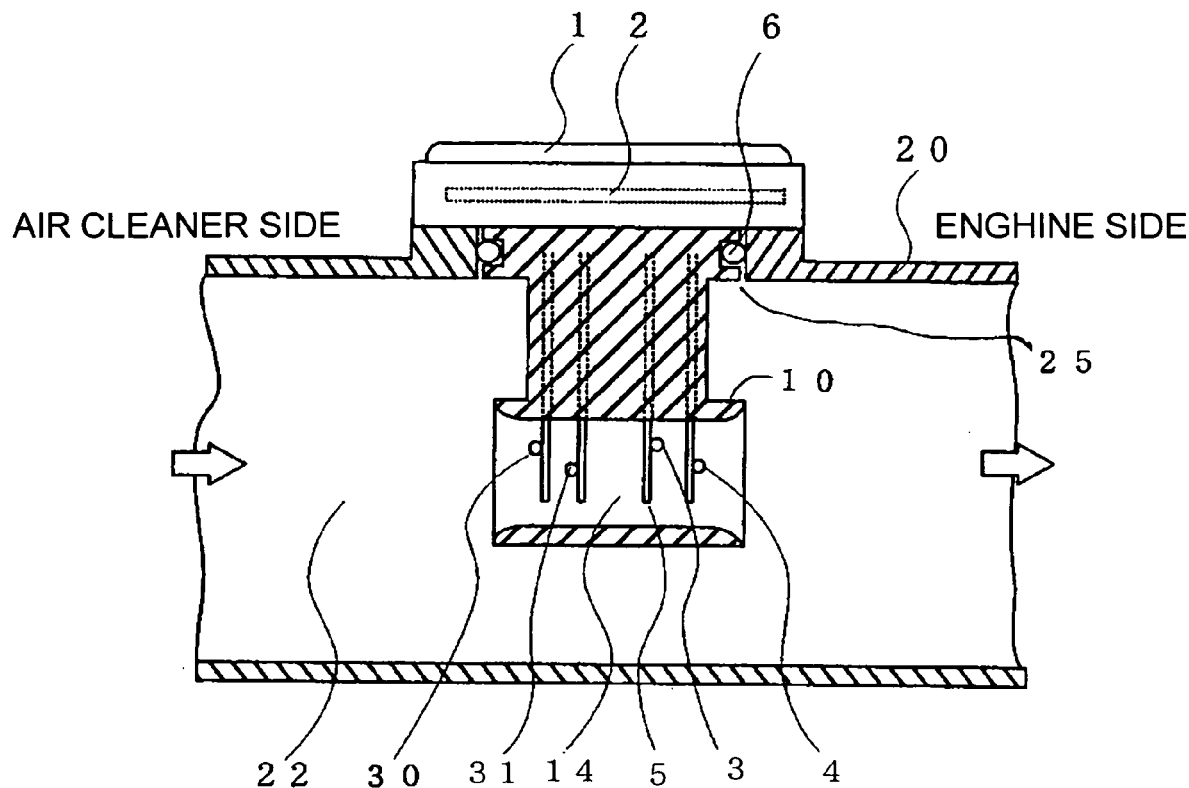
FIG. 3 shows a schematic longitudinal cross section of the thermal type air flow measuring instrument according to the embodiment of the invention as it is applied for controlling an internal combustion engine.
Figure 4:
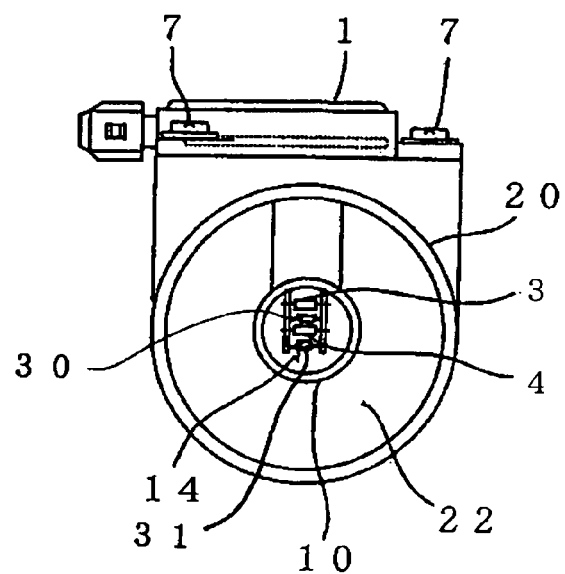
FIG. 4 shows a schematic lateral cross section of the thermal type air flow measuring instrument according to the embodiment of the invention as it is applied for controlling an internal combustion engine.

FIG. 3 shows a longitudinal cross section of a more specific example in which the thermal type air flow measuring instrument of the present embodiment is applied for the control of an internal combustion engine. FIG. 4 shows a lateral cross section of the instrument as seen from the upstream (left) thereof.

The components of the thermal type air flow measuring instrument include a housing member 1 containing the circuit substrate 2 forming the drive circuit, and an auxiliary-passage constituent member 10 formed by an electrically non-conducting member. In the auxiliary passage constituent member 10, the first heating resistor 3 for air flow detection, the temperature sensing resistor 4 for compensating the intake air temperature, the second heating resistor 30, and the intake temperature measurement means 31 are electrically connected to the circuit substrate 2 via a support 5 made of an electrically conductive material.

The housing 1, circuit substrate 2, auxiliary passage 10, heating resistors 3 and 30, temperature sensing resistor 4, and intake temperature measurement means 31, for example, are constructed as an integral module of the thermal type air flow measuring instrument.

An opening 25 is formed in the wall surface of a main passage constituting member 20 that forms an intake pipe. The auxiliary passage 14 of the thermal type air flow measuring instrument is inserted into this opening 25 from outside, and the wall surface of the constituent member of the auxiliary passage 10 is fixed to the housing member 1 via screws 7, for example, such that necessary mechanical strength can be maintained.

A seal member 6 is attached between the constituent member of the auxiliary passage 10 and the constituent member of the main passage 22 so as to ensure the hermetic sealing of the intake pipe.

Thus, in accordance with the above-described embodiment of the invention, the terminal voltage across the second heating resistor, to which a constant current is supplied, is measured to calculate its resistance value. By comparing a temperature corresponding to the calculated resistance value with the temperature measured by the temperature detecting element that measures the actual temperature, the level of contamination of the second heating resistor can be measured.

Since the second heating resistor is disposed in a similar environment to that of the first heating resistor, the level of contamination of the second heating resistor can be regarded as substantially the same as the level of contamination of the first heating resistor.

The output signal from the first heating resistor is then corrected in accordance with the thus determined level of contamination. Thus, a thermal type air flow measuring instrument can be realized that is capable of accurately correcting a change in the radiation heat characteristics of the heating resistor due to contamination and measuring air flow with high precision.

Hereafter, another example in which the thermal type air flow measuring instrument is applied to an internal combustion engine control system.

Figure 5:
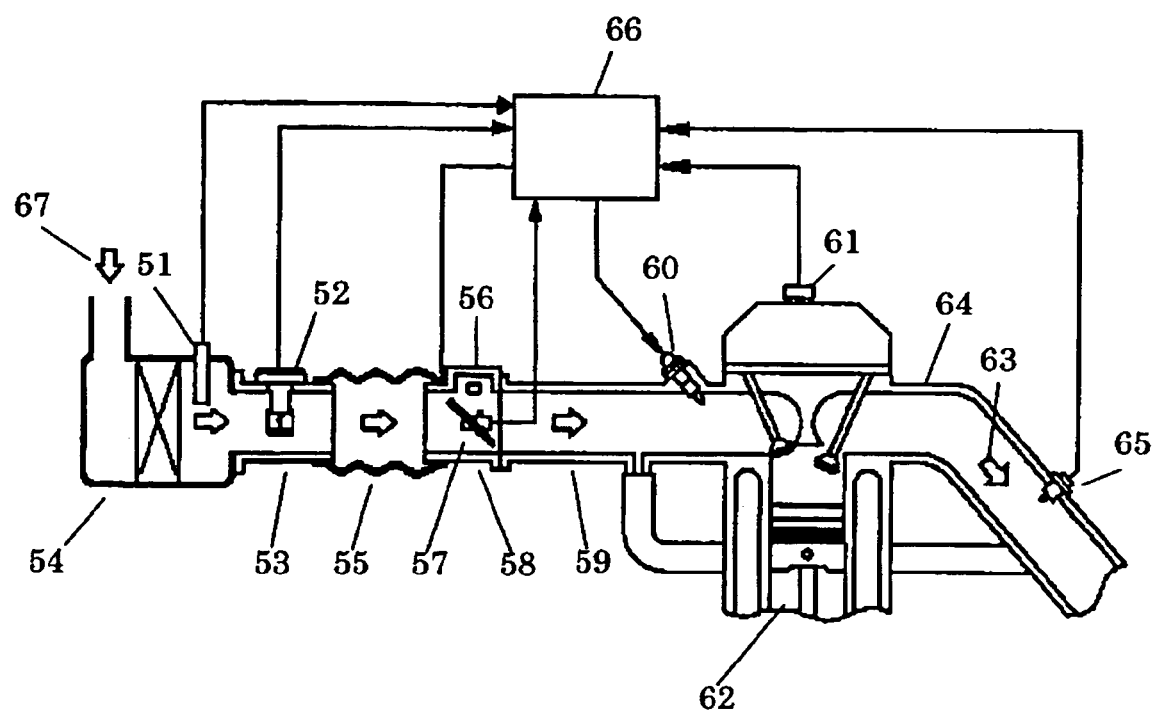
FIG. 5 schematically shows the entire configuration of an engine control system according to the invention as it is applied to an internal combustion engine of the electronic fuel injection type.

FIG. 5 schematically shows the entire configuration of the engine control system.

Intake air 67 enters via an air cleaner 54 and is delivered to an engine cylinder 62 via a body 53 of the thermal type air flow measuring instrument, an intake duct 55, a throttle body 58, and an intake manifold 59 mounting an injector 60 to which fuel is supplied. Gas 63 produced inside the engine cylinder. 62 is discharged via an exhaust manifold 64.

An engine control unit 66 is fed with an intake temperature signal from an intake temperature sensor 51, an air flow signal outputted from a circuit module 52 of the thermal type air flow measuring instrument, an intake air temperature signal from a temperature sensor, a throttle valve angle signal outputted from a throttle angle sensor 57 within an idle air control valve 56, an air/fuel ratio signal outputted from an air/fuel ratio sensor 65 provided in the exhaust manifold 64, and an engine rotation speed signal from an engine rotation speed meter 61, for example.

The control unit 66 then determines an optimum fuel injection amount and idle air control valve opening (intake air flow) by calculating these signals, and then controls the operation of the injector 60 and the idle control valve 56 on the basis of the calculated values.

By thus applying the thermal type air flow measuring instrument of the invention to the engine control system shown in FIG. 5, air flow can be accurately measured at all times, even during engine operation, allowing an accurate engine control to be performed.

Since an optimum state of fuel combustion in the engine can be achieved, aggravation of the quality of exhaust gas can be prevented.

While the above-described example involved the application of the invention to an air flow measuring apparatus for an internal combustion engine, the invention can be applied not only for the measurement of air flow but also in any flow measuring apparatuses with a heating resistor that is subject to contamination.

The invention can be applied not only for the measurement of air flow but also to the flow of other gases, such as hydrogen.

While the above-described examples involved the correction of changes in the radiation heat characteristics of a heating resistor due to contamination, such as by the attachment of dust, the invention can also be applied for correcting changes in radiation heat characteristics due to reasons other than contamination.

What is claimed is:

1. A thermal type gas flow measuring instrument for measuring gas flow by supplying a heating current to a heating resistor and measuring the amount of heat dissipated from said heating resistor into the gas, said thermal type gas flow measuring instrument comprising:

a first heating resistor for obtaining an output value for measuring gas flow on the basis of the heating current;

a second heating resistor for calculating a change in the radiation heat characteristics of said first heating resistor; and a correction means for correcting the output value from said first heating resistor by detecting the radiation heat characteristics of said second heating resistor and calculating a change in the radiation heat characteristics of said first heating resistor.

2. The thermal type gas flow measuring instrument according to claim 1, wherein said first and said second heating resistors are disposed in the same gas passage, and wherein said second heating resistor is heated by being fed with a substantially constant current.

3. The thermal type gas flow measuring instrument according to claim 2, wherein the heating temperature of said second heating resistor is substantially the same as an average heating temperature of said first heating resistor.

4. The thermal type gas flow measuring instrument according to claim 2, further comprising a temperature detecting element disposed in said gas passage for measuring gas temperature.

5. The thermal type gas flow measuring instrument according to claim 2, wherein said correction means comprises a generated-heat temperature calculation means for measuring the temperature of heat generated by said second heating resistor, wherein the radiation heat characteristics of said second heating resistor are detected on the basis of the generated-heat temperature calculated by said generated-heat temperature calculation means.

6. The thermal type gas flow measuring instrument according to claim 4, wherein said correction means comprises:

a generated-heat temperature calculation means for calculating the temperature of heat generated by said second heating resistor;

a temperature comparison means for comparing the generated-heat temperature calculated by said generated-heat temperature calculation means with a detection temperature detected by said temperature detecting element;

a correction amount calculating means for calculating the amount of correction for an output value from said first heating means on the basis of the result of comparison by said temperature comparison means; and a correction processing means for correcting the output value from said first heating resistor on the basis of the correction amount calculated by said correction amount calculating means.

7. A thermal type air flow measuring instrument for measuring intake air flow by supplying a heating current to a heating resistor and measuring the amount of heat dissipated by said heating resistor into intake air in an internal combustion engine, said thermal type air flow measuring instrument comprising:

a first heating resistor disposed in an intake air passage for obtaining an output value for measuring air flow on the basis of the heating current;

a second heating resistor disposed in said intake air passage for calculating a change in the radiation heat characteristics of said first heating resistor;

a temperature detecting element disposed in said intake air passage for measuring the temperature of intake air;

a generated-heat temperature calculation means for calculating the temperature of heat generated by said second heating resistor;

a temperature comparison means for comparing the generated-heat temperature calculated by said radiated-heat temperature calculation means with a detection temperature detected by said temperature detecting element;

a correction amount calculation means for calculating an amount of correction for the output value from said first heating resistor on the basis of the result of comparison by said comparison means; and a correction processing means for correcting the output value from said first heating resistor on the basis of the correction amount calculated by said correction amount calculation means.

8. An internal combustion engine control system for controlling the intake air flow and the amount of fuel supply to an internal combustion engine in accordance with intake air flow measured by supplying a heating current to a heating resistor and measuring the amount of heat dissipated by said heating resistor to the intake air in the internal combustion engine, said internal combustion engine control system comprising:

a first heating resistor disposed in an intake air passage for obtaining an output value for measuring air flow on the basis of the heating current;

a second heating resistor disposed in said intake air passage for calculating a change in the radiation heat characteristics of said first heating resistor;

a temperature detecting element disposed in said intake air passage for measuring the temperature of intake air;

a generated-heat temperature calculation means for calculating the temperature of heat generated by said second heating resistor;

a temperature comparison means for comparing the generated-heat temperature calculated by said generated-heat temperature calculation means with a detection temperature detected by said temperature detecting element;

a correction amount calculation means for calculating an amount of correction for the output value from said first heating resistor on the basis of the result of comparison by said comparison means;

a correction processing means for correcting the output value from said first heating resistor on the basis of the correction amount calculated by said correction amount calculation means; and an engine control unit for controlling the intake air flow and the amount of fuel supply to the engine on the basis of an intake air flow calculated on the basis of said output value as corrected by said correction processing means.

* * * * *